(No Model.)
M. F. DAVIS.
MOLDED BOAT AND OTHER ARTICLES FROM CELLULOID, CELLULOSE, AND OTHER PLASTIC MATERIALS.
No. 259,826. Patented June 20, 1882.
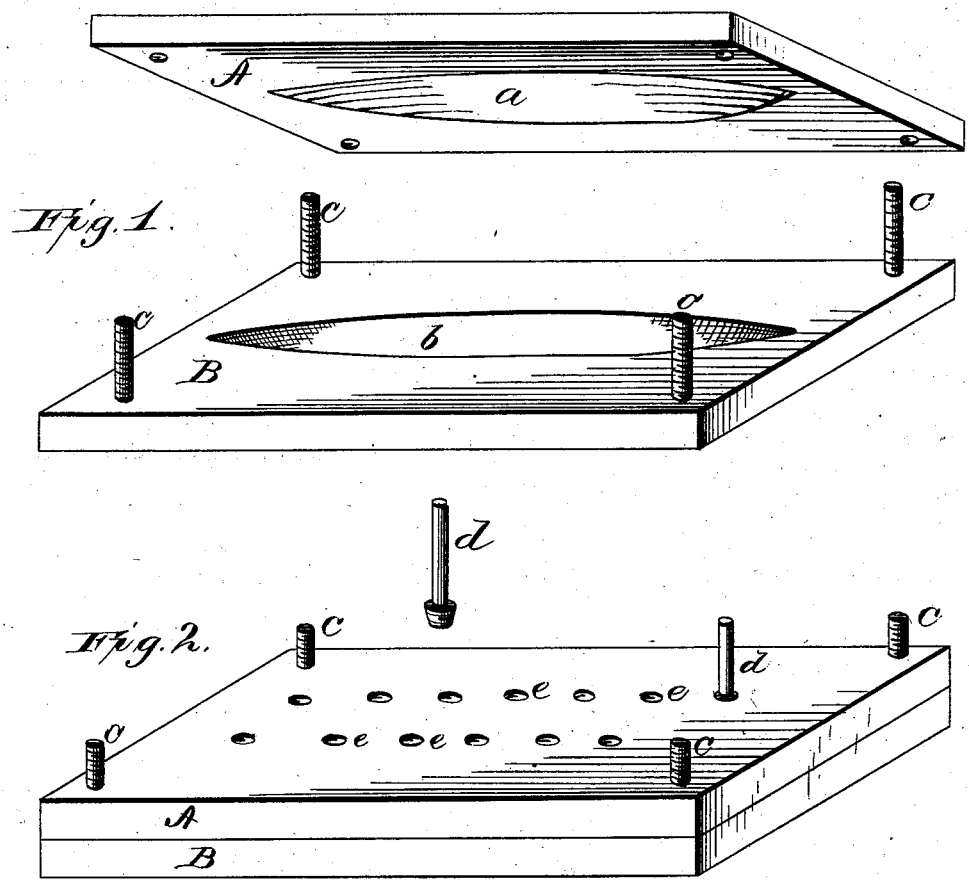

UNITED STATES PATENT OFFICE.

MICHAEL F. DAVIS, OF PORTLAND, MAINE.

MOLDED BOAT AND OTHER ARTICLES FROM CELLULOID, CELLULOSE, AND OTHER PLASTIC MATERIALS.

SPECIFICATION forming part of Letters Patent No. 259,826, dated June 20, 1882.

Application filed May 22, 1880. Renewed May 9, 1882. (No model.)

*To all whom it may concern:*

Be it known that I, MICHAEL F. DAVIS, a citizen of the United States, residing at Portland, in the county of Cumberland and State of Maine, have invented certain new and useful Improvements in Molded Boats and other Articles from Celluloid, Cellulose, and other Plastic Materials; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 shows the molds separated, but ready to be placed the one on the other for use. Fig. 2 shows the mold as ready for use.

The object of this invention is to produce a very light and strong boat; and the novelty consists chiefly in the process or details of the manufacture, all as will now be more fully and at length set out and explained.

In the accompanying drawings the mold represented by the two parts A and B, which are made of metal, has in the one part, as at $a$ in relief and at $b$ in depression, the proper shapes to form, when said parts are properly brought together, the matrix into which the plastic material being or having been placed will be shaped into the desired form. To make the boat of celluloid the parts of the said mold being properly secured together, as by screw-bolts $c$, as many as may be necessary, the celluloid can be inserted in the holes $e$ in the plate. It is evident that said holes may be made in either part of the mold, as may be desired. The celluloid can be forced into the matrix by means of the screw-plungers $d$, or in any easy or convenient way. When the matrix has been properly filled the said holes $e$ are filled by the screw-plungers $a$, by screw-plugs, or in any desired way. The mold can be thus filled, as above described, without first tightening the screw-bolts $c$, and after the celluloid has been filled into the matrix the parts of the mold can now be forced tight and close together by means of said screws. The mold, when thus made ready, is subjected to furnace or steam heat of the required temperature and for the proper length of time. It will be preferable to make such a rabbet at the edge of the matrix as will serve to form the gunwale of the boat.

While I have now explained how the boat can thus be made under pressure and heat of one plastic material, it can be thus made by placing in the matrix cellulose, paper-pulp, papier-maché, or any other desired plastic material, and over this putting thin layers or strips of wood laid transversely, and over these sheets of paper, cloth, or thin material. The different parts, being thus properly prepared, are forced into shape in the matrix and the mold subjected to the required heat, as above described; or I may make the boat of thin wood or pieces of wood and fill its pores or body with spermaceti by the means and process now described. So, also, I may use celluloid with wood or with linen in the like manner as I have above explained. It is also evident that I may use any desired shape or size for this mold, and may have it in any desired number of pieces, the essential point of my invention being to obtain by means of heat and pressure an exceedingly thin and light boat, and one that will be strong and not leak or lose its form under any ordinary conditions of use.

Having thus described my invention, what I consider new, and desire to secure by Letters Patent, is—

1. A boat made or molded under pressure and heat from celluloid, cellulose, or other plastic materials, substantially in the manner and for the purposes set forth.

2. A boat made or molded under pressure and heat from wood, paper, celluloid, cellulose, linen or wood, and spermaceti, or a combination of these or any of them, substantially as described.

In testimony whereof I affix my signature in presence of two witnesses.

MICHAEL F. DAVIS.

Witnesses:
 JOSEPH FORREST,
 ROBERT LYNCH.